(12) United States Patent
Mayers

(10) Patent No.: US 9,908,570 B1
(45) Date of Patent: Mar. 6, 2018

(54) ELECTRIC BEACH WAGON

(71) Applicant: Jack D. Mayers, Damascus, PA (US)

(72) Inventor: Jack D. Mayers, Damascus, PA (US)

(*) Notice: Subject to any disclaimer, the term of this patent is extended or adjusted under 35 U.S.C. 154(b) by 0 days.

(21) Appl. No.: 15/140,719

(22) Filed: Apr. 28, 2016

Related U.S. Application Data

(60) Provisional application No. 62/154,777, filed on Apr. 30, 2015.

(51) Int. Cl.
*B62B 3/02* (2006.01)
*B62B 7/06* (2006.01)
*B62D 51/04* (2006.01)

(52) U.S. Cl.
CPC ............... *B62D 51/04* (2013.01); *B62B 3/02* (2013.01); *B62B 7/06* (2013.01)

(58) Field of Classification Search
CPC .......... B62D 61/08; H01M 10/44; B62B 3/02; B62B 7/06
See application file for complete search history.

(56) References Cited

U.S. PATENT DOCUMENTS

| | | | | |
|---|---|---|---|---|
| 2,903,082 A * | 9/1959 | Marcus | ..................... | B62B 3/12 180/19.1 |
| 3,388,761 A * | 6/1968 | Arpin | ..................... | B62D 61/08 180/208 |
| 4,063,612 A * | 12/1977 | Weiss | ................... | B62B 5/0026 180/12 |
| 4,637,626 A * | 1/1987 | Foss | .................... | A45C 13/385 16/113.1 |
| 4,807,716 A | 2/1989 | Hawkins | | |
| 5,249,823 A * | 10/1993 | McCoy | ..................... | B62B 3/02 280/144 |
| 5,307,889 A * | 5/1994 | Bohannan | ............ | B62D 51/008 180/13 |
| 6,070,679 A | 6/2000 | Berg et al. | | |
| 6,733,026 B1 * | 5/2004 | Robberson | ................ | B62B 3/02 280/30 |
| 6,845,991 B1 * | 1/2005 | Ritucci | ................... | B62B 3/007 280/30 |
| 7,017,691 B2 | 3/2006 | Lu | | |
| 7,210,545 B1 | 5/2007 | Waid | | |
| 7,762,363 B1 | 7/2010 | Hirschfeld | | |

(Continued)

OTHER PUBLICATIONS

The SandHopper. Product Listing [online]. SandHopper, 2011 [retrieved on Feb. 4, 2015]. Retrieved from the Internet: http://electricbeachwagons.com.

(Continued)

*Primary Examiner* — Joseph M Rocca
*Assistant Examiner* — Daniel S Yeagley
(74) *Attorney, Agent, or Firm* — Robert C. Montgomery; Montgomery Patent & Design LP

(57) ABSTRACT

A beach wagon has a motor and gear box which operates the rear axle and wheels of the wagon through use of an on-board power source. The motor is controlled by a switch and throttle lever located within the handle of the wagon. The switch and throttle lever communicate with the motor using electrical wiring which runs through the handle and along the underside of the wagon. The handle is connected to a pair of front wheels which are affixed to one (1) pivoting caster. The frame of the wagon is centrally hinged at a line which runs parallel to the rear axle.

19 Claims, 6 Drawing Sheets

(56) References Cited

U.S. PATENT DOCUMENTS

| | | | |
|---|---|---|---|
| 8,069,939 B1 | 12/2011 | Metzler | |
| 8,136,823 B2 * | 3/2012 | Harding | B62B 3/008 |
| | | | 280/47.34 |
| 8,286,739 B2 | 10/2012 | Oliphant | |
| 8,453,771 B1 * | 6/2013 | Hirschfeld | B60L 8/003 |
| | | | 180/19.1 |
| 8,511,406 B2 | 8/2013 | Anasiewicz | |
| 8,596,389 B2 | 12/2013 | Anasiewicz | |
| 8,746,377 B1 * | 6/2014 | Dunbar | B62B 5/0003 |
| | | | 180/19.2 |
| 2003/0025301 A1 * | 2/2003 | Banuelos, III | B62B 3/007 |
| | | | 280/651 |
| 2008/0041644 A1 * | 2/2008 | Tudek | B60L 7/12 |
| | | | 180/65.1 |
| 2010/0123294 A1 * | 5/2010 | Ellington | B62B 3/007 |
| | | | 280/47.371 |
| 2010/0156069 A1 * | 6/2010 | Chen | B62B 3/007 |
| | | | 280/639 |
| 2012/0168237 A1 * | 7/2012 | Oliphant | H01M 10/44 |
| | | | 180/65.1 |
| 2014/0353945 A1 * | 12/2014 | Young | B62B 3/02 |
| | | | 280/650 |
| 2015/0035258 A1 * | 2/2015 | Chen | B62B 3/02 |
| | | | 280/651 |

OTHER PUBLICATIONS

The Zoom-Buggy. Product Listing [online]. Zoom-Buggy, 2012 [retrieved on Feb. 4, 2015]. Retrieved from the Internet: http://zoom-buggy.com.

* cited by examiner

ELECTRIC BEACH WAGON

RELATED APPLICATIONS

The present invention was first described in and claims the benefit of U.S. Provisional Application No. 62/154,777, filed Apr. 30, 2015, the entire disclosures of which are incorporated herein by reference.

FIELD OF THE INVENTION

The present invention relates generally to the field of motorized beach cart devices and more specifically relates to a portable beach necessities container driven by an electric motor aided by a solar panel.

BACKGROUND OF THE INVENTION

The transportation of beach necessities such as chairs, towels, umbrellas, sandals, buckets, and similar goods is burdensome requirement for most beach goers. Often times, a long walk is required to get to and from a desired location on the beach all the while trying handle a combination of beach paraphernalia and in many cases, children. Since relaxation time on the beach is coveted by many beach-goers it is therefore desirable to spend less time transporting beach necessities to a location on the beach. To accomplish this task, many beach-goers make use of a wheeled cart or wagon to transport their beach paraphernalia.

Most beach carts and wagons available today are similar to child wagons or shopping carts and do not provide motorized propulsion. These carts and wagons are generally supported by two (2) wheels, bulky, unwieldy and usually require manual transportation. In addition to these concerns, a chief drawback of such transportation devices is that maneuvering a wheeled cart on a beach is very strenuous due to the resistance of the sand. A need therefore exists to provide safe, efficient means of moving beach necessities from a vehicle or residence to and from the beach without multiple trips or over-exertion.

Various attempts have been made to solve problems found in foldable motorized beach cart systems art. Among these are found in: U.S. Pat. No. 8,286,739 to John Oliphant; U.S. Pat. No. 7,762,363 to Seven L. Hirschfield; U.S. Pat. No. 7,210,545 to Jerry Paul Waid; U.S. Pat. No. 7,017,691 to Sheng-Kuai Lu; U.S. Pat. No. 8,746,377 to Chris T. Dunbar; U.S. Pat. No. 8,511,406 to Stephen A. Anasiewicz. These prior art references are representative of motorized and foldable beach carts and wagons.

None of the above inventions and patents, taken either singly or in combination, is seen to describe the invention as claimed. Thus, a need exists for a reliable and foldable motorized beach cart system to obviate the above-mentioned problems.

SUMMARY OF THE INVENTION

The present invention advantageously fills the aforementioned deficiencies by providing a folding beach cart, comprising either an aluminum or plastic frame assembly, a rear plate attached to a rear underside of the frame assembly, a rear axle mount attached to a first side of the rear plate, a front plate attached to a front underside of the frame assembly, a front axle mount attached to an underside of the front plate, a handle mount attached to the front axle mount, a handle assembly pivotally mounted to the handle mount, further comprising a control means, at least one (1) front wheel attached to a front axle, the front axle attached the front axle mount, at least one (1) rear wheel attached to a rear axle, the rear axle attached to the rear axle mount and a drive train in electrical communication with a power source and the control means. The drive train is attached to the rear axle mount and moves each the rear wheel. A first portion of the frame assembly is hingedly attached to a second portion of the frame assembly while the handle assembly folds against the frame assembly to enable the beach cart to fold.

The first portion of the frame assembly may comprise a first plurality of U-shaped tubing secured to a first side of a hinge while the second portion of the frame assembly comprises a second plurality of U-shaped tubing secured to a second side of the hinge and is congruous to the first U-shaped tubing. The hinge may be a piano hinge. The drive train of the cart may comprise at least one (1) gear box in mechanical communication with the rear axle and at least one (1) motor in mechanical communication with the gear box. The motor may be in electrical communication with the power source and actuates the gear box which in turn rotates the rear axle.

The handle assembly may comprise a handle post pivotally secured at a proximal end to the handle mount and a handle which is secured to a distal end of the handle post. The handle may also comprise a throttle switch and a directional switch. Both the throttle and directional switches are in electrical communication with the motor and the power source. The throttle switch, when actuated, accelerates the motor and when deactivated, permits the motor to decelerate while the directional switch, when activated, shifts to an opposite rotation of the motor. The throttle switch and directional switch may be in electrical communication with the motor and the power source by electrical wiring channeled through a cavity within the handle post.

The cart's power source may be a rechargeable battery while the rear plate may further comprise a charging port which is located within a second side of the rear plate. The charging port may also be in electrical communication with a solar panel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
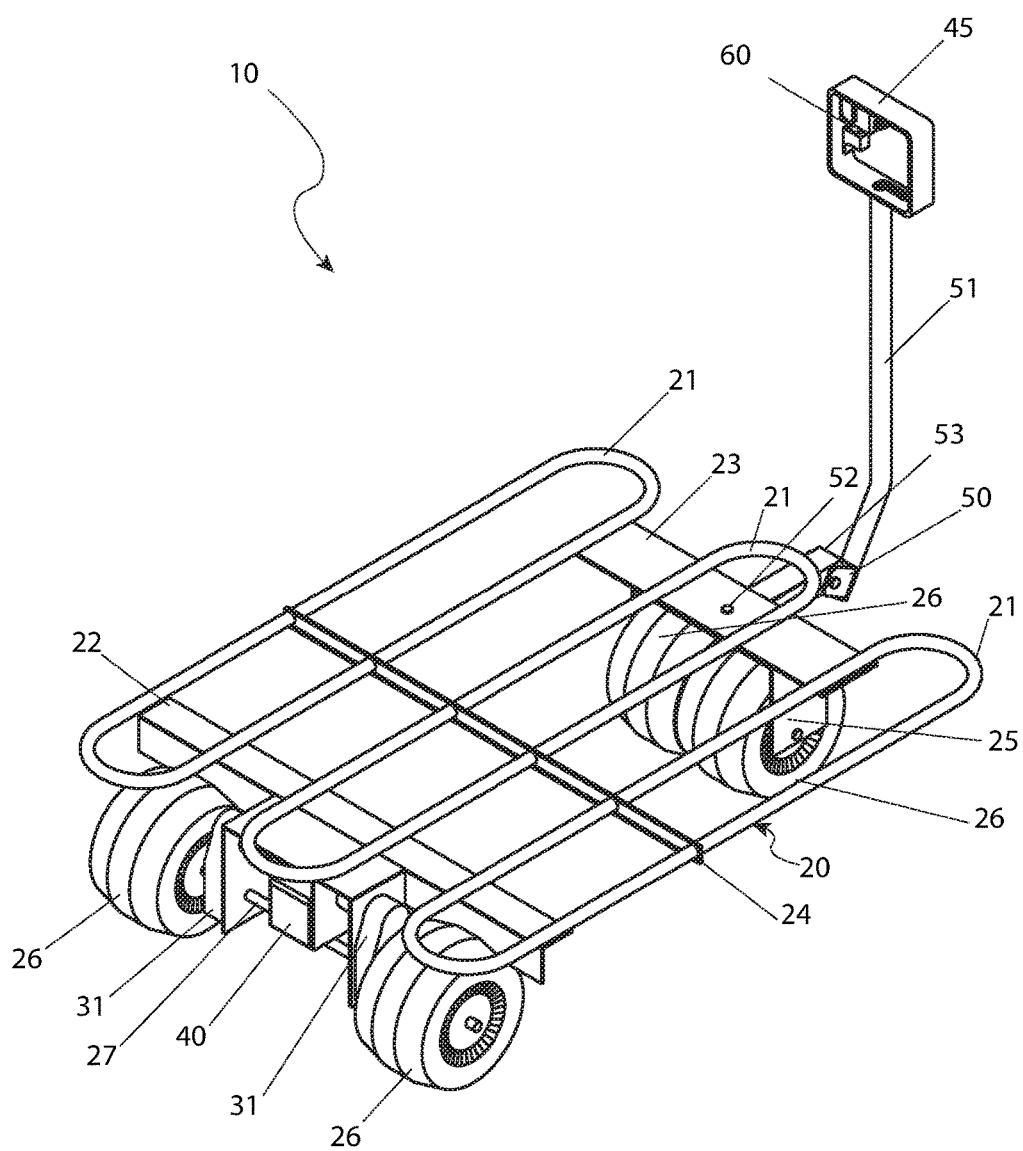
FIG. 1 is a perspective view of a foldable motorized beach cart 10 during an "in-use" condition, according to a preferred of the present invention.
Figure 2:
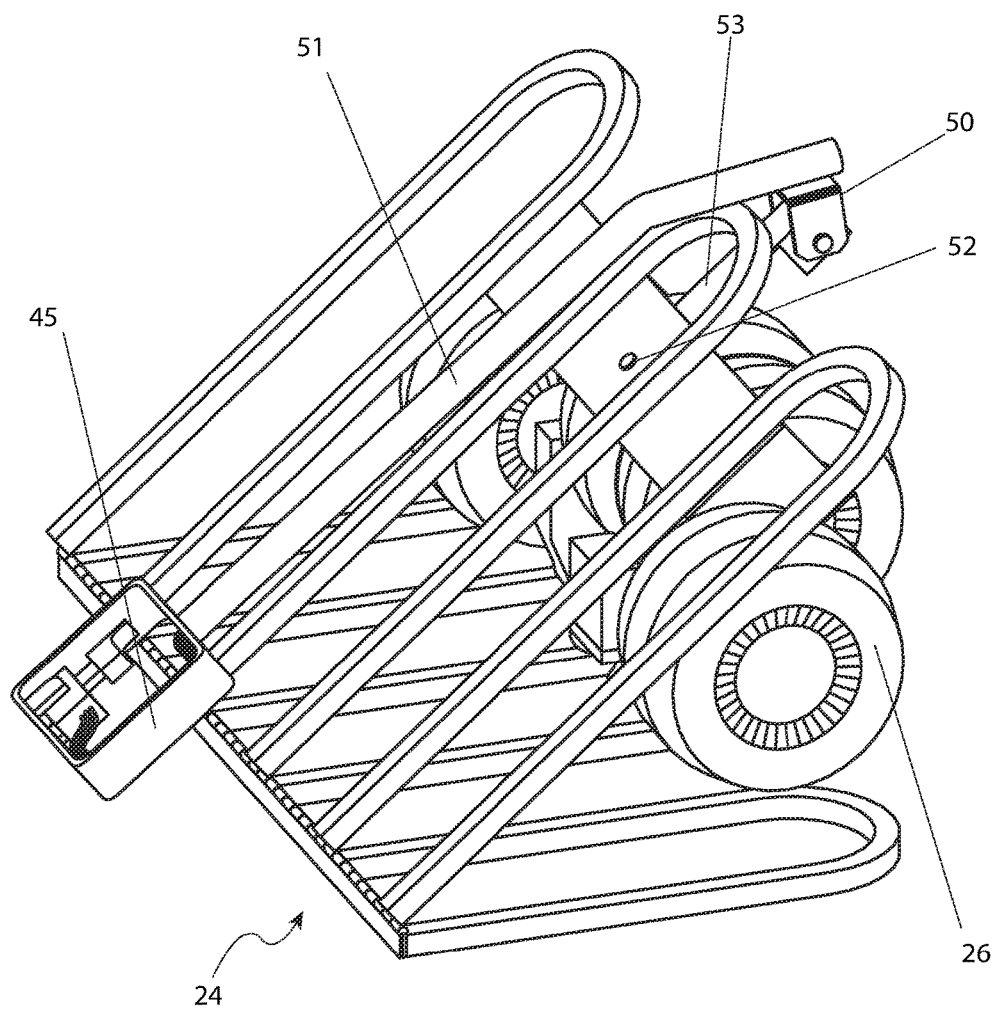
FIG. 2 is a side view illustrating the foldable motorized beach cart 10 in a collapsed position according to a preferred of the present invention.

DESCRIPTIVE KEY 10 foldable motorized beach cart
20 frame assembly
21 "U"-shaped frame member
22 rear plate
23 front plate
24 piano hinge
25 axle mount
26 wheel
27 rear axle
28 charging port
30 motor
31 gear box
40 battery
45 handle
50 handle pivot
51 handle post
52 steering pivot
53 steering post
60 throttle switch
61 directional switch
65 solar charger

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention is directed to a foldable motorized beach cart 10. Generally speaking, a foldable motorized beach cart 10 may be useful for easily transporting beach-related items across sand.

In one (1) embodiment of the present invention, the foldable motorized beach cart 10 may comprise a frame assembly 20 made of a plurality of "U"-shaped frame members 21. The "U"-shaped frame members 21 constitute a bottom framing bed where goods, objects, discoveries, and other items may be placed. The "U"-shaped frame pieces members 21 extend from a piano hinge 24 to the rear and to the front- and may be advantageously designed such that the "U"-shaped frame members 21 that extend to the rear are shorter than the "U"-shaped frame members 21 that extend to the front. The piano hinge 24 may comprise a hinge bar and pins. Any use of a specific type of hinge mechanism such as the piano hinge 24 is not intended to be a limiting factor of the present invention.

The foldable motorized beach cart 10 may further comprise a front plate 23 and a rear plate 22. The front plate 23 may be attached underneath the front "U"-shaped frame members 21 near the front of the foldable motorized beach cart 10 and may stabilize the front "U"-shaped frame members 21. In addition, the front plate 23 supports a steering post 53 for a handle pivot 50 of a steering unit. Furthermore, the rear plate 22 may be attached underneath the bottom framing bed near the rear of the foldable motorized beach cart 10 and may support rear "U"-shaped frame members 21, an axle mount 25, a rear axle 27, and a motor or motors 30.

In order to accommodate movement of the foldable motorized beach cart 10, two (2) wheels 26 may be attached to a front axle and two (2) wheels 26 may be attached to a rear axle 27, thus providing a stable base.

At least one (1) power source in the form of a battery 40 may be mounted to the rear plate 22, as shown. The battery 40 may be manufactured to be rechargeable and to store enough power to run the motor 30 for a desired amount of time. In other embodiments, a wall charger utilizing AC voltage may be provided for operating power. Further, a recharging power source may comprise a solar charger 65 for utilizing solar energy. Alternatively, a car charger may be used for purposes of charging the battery 40.

To further accommodate movement, the motor 30 and the axle mount 25 may be mounted under the rear plate 22. This motor 30 and axle mount 25 may be designed-to permit routing of the rear axle 27 there through. The foldable motorized beach cart 10 also has a gear box 31 which may be in mechanical communication with the motor 30. This gear box 31 may allow for multiple user-friendly speed setting which may be controlled by the user via simple controls.

For purposes of easy maneuverability and steering control, the handle pivot 50 is mounted to the front plate 23 by way of the steering post 53. This handle pivot 50 is operatively attach to a front axle which allows two (2) front wheels 26 to be mounted side by side to a steering pivot 52 to provide a central steering pivot point. A steering and control handle 45 may be attached to a hollow handle post 51 which extends from the handle pivot 50. The handle 45 may be operated by a user squeezing switches that are installed in the handle 45. The user can operate a speed controlling throttle switch 60 and alternatively a directional switch 61 for motion control. The throttle switch 60 takes the form of a trigger lever that enables acceleration.

In one (1) embodiment of the present invention, the foldable motorized beach cart 10 may accommodate beach paraphernalia. In other embodiments of the present invention, the foldable motorized beach cart 10 may retain fishing products, golfing products, camping products, construction products, and other objects that may fit within a container supported on the foldable motorized beach cart 10.

In one (1) embodiment of the present invention, the foldable motorized beach cart 10 may be manufactured of aluminum. In other embodiments of the present invention, the foldable motorized beach cart 10 may be manufactured of plastic or other suitable structural materials. The foldable motorized beach cart 10 may come supplied with bungee cords to secure items to cart for transport or may alternatively have folding side rails to keep items on the foldable motorized beach cart 10 during travel.

Reiterating and referring to FIG. 1 for a perspective view of the foldable motorized beach cart 10 showing a frame assembly 20 supporting a battery 40 and a pair of motors 30 and a control system built into the handle 45 comprising switches 60 and 61. The foldable motorized beach cart 10 may comprise a cart frame assembly 20 that may be constructed from one inch (1 in.) aluminum tubing and onequarter inch (¼ in.) aluminum plate. The drive train may incorporate wheels 26 on rear axles 27, and which are driven by a gear box 31 and a motor 30 similar to those found on the vehicles within the Power Wheels™ brand. The wheels 26 may be approximately six inches (6 in.) wide and eleven inches (11 in.) in diameter with large treads useful for allowing the foldable motorized beach cart 10 to ride easily on soft beach sand. For ease of transportation, the cart may be foldable via the piano hinge 24 which is affixed to the "U"-shaped frame members 21 and which allows the foldable motorized beach cart 10 to fold up. The rear wheels 26 may be mounted to the outside of the frame assembly 20 and front wheels 26 may be mounted in the center of the frame assembly 20 so as to allow the front wheels 26 to fit between the rear wheels 26 when folded. The battery 40 and may be charged using a charging port 28 and a solar charger 65.

Figure 3:
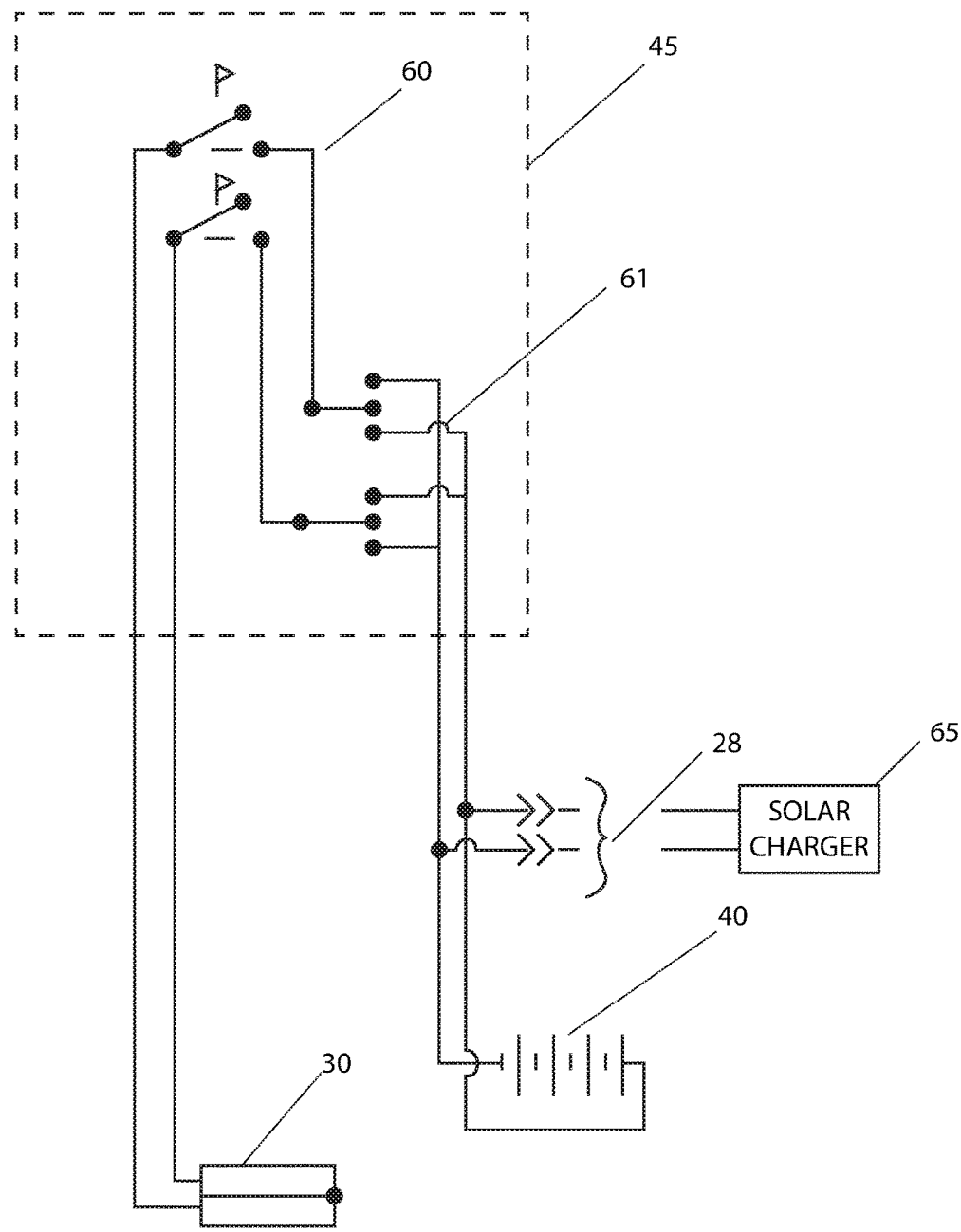
FIG. 3 is an electrical block diagram depicting the electrical components used in the foldable motorized beach cart 10, according to a preferred of the present invention.

Referring now to FIG. 3, a diagram illustrating a variable speed forward and rearward wiring circuit comprising at least one (1) charge port 28 wherein electricity may flow in and out of the wiring circuit is shown.

Figure 4:
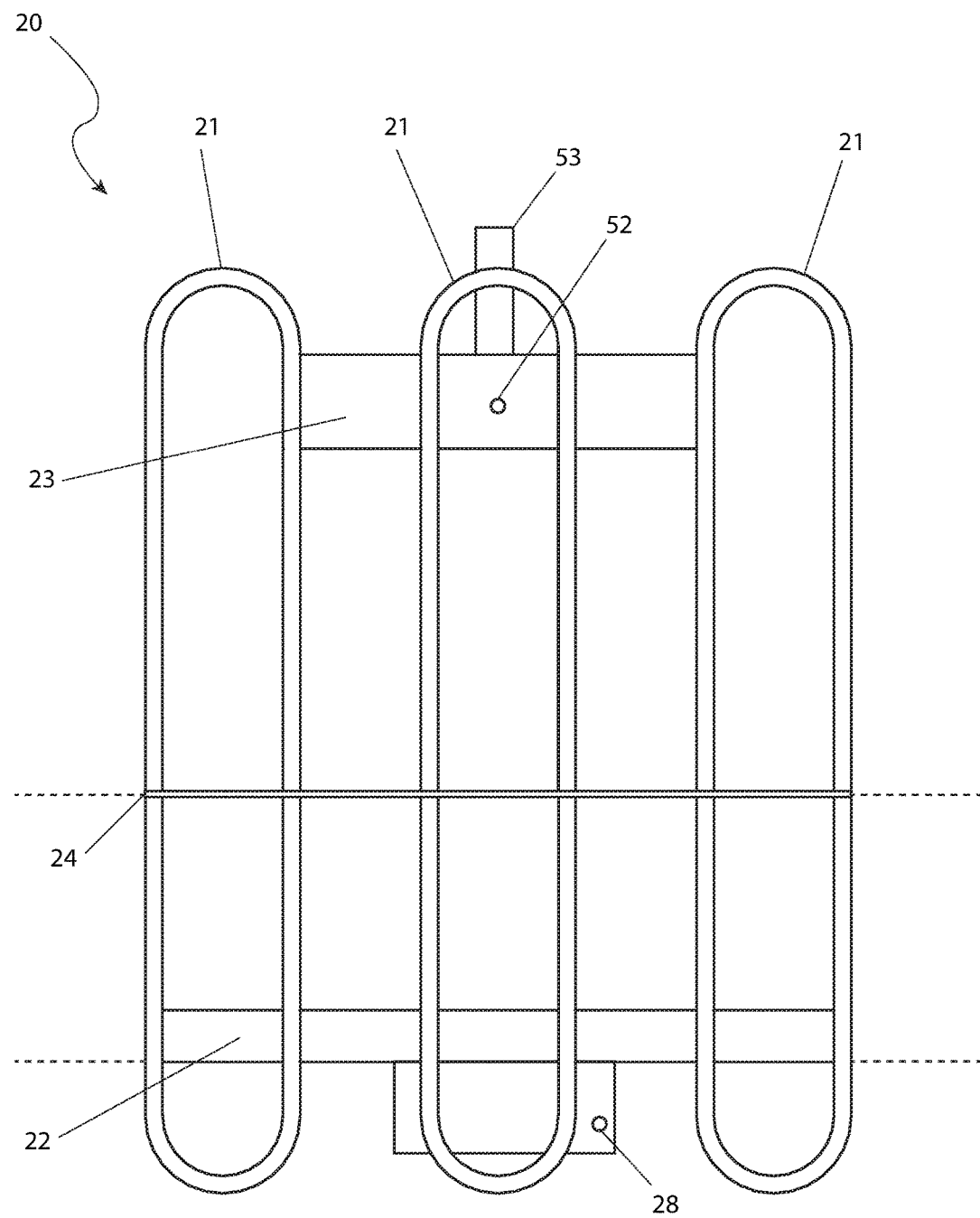
FIG. 4 is a top perspective view of a frame assembly 20 as used with the foldable motorized beach cart 10, according to a preferred of the present invention.

Referring next to FIG. 4, a top perspective view of a foldable motorized beach cart 10 comprising at least one (1) "U"-shaped frame piece member 21, at least one (1) piano hinge 24, a front plate 23 and a rear plate 22 is depicted. In a preferred embodiment of the present invention, the foldable motorized beach cart 10 may comprise six (6) separate "U"-shaped frame pieces members 21. The three (3) front "U"-shaped frame members 21 may be longer than the three (3) rear "U"-shaped frame members 21 for proper folding. A rear plate 22 may serve as support for the motor 30, the battery 40, the gear box 31, and the axle mount 25. The rear plate 22 may be bent at ninety degree (90°) angle (thus being angle iron) for added strength. The rear plate 22 may be cut on each side two-thirds-of-an-inch (⅔ in.) from the front to the width of one (1) "U"-shaped frame piece member 21.

Figure 5A:
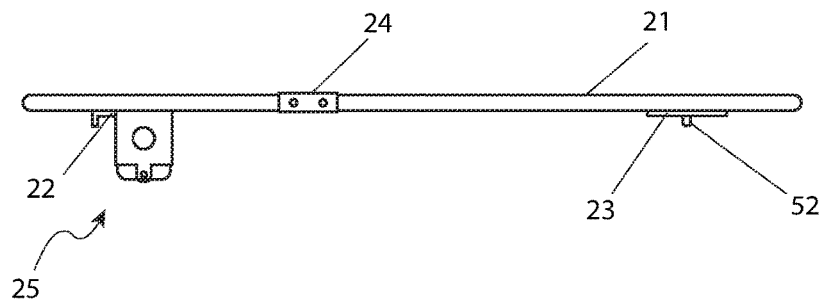
FIG. 5a shows a side perspective view of the frame assembly 20, according to a preferred embodiment of the present invention.
Figure 5B:
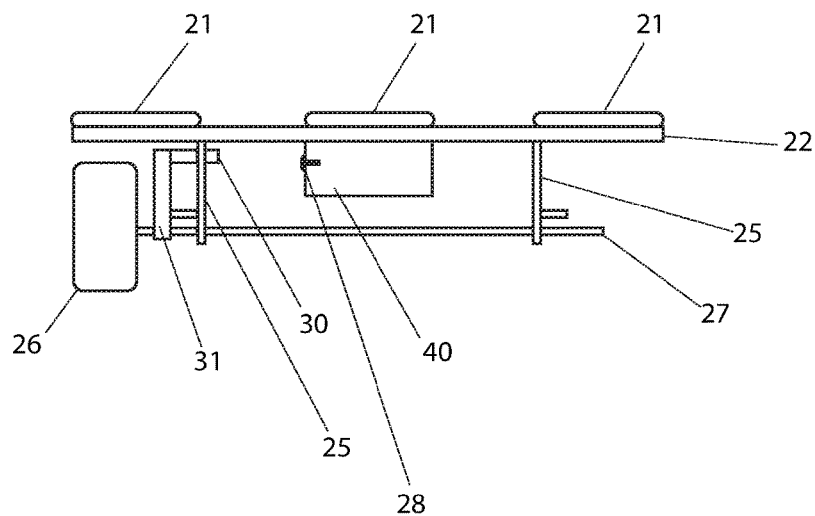
FIG. 5b shows a partial rear perspective view of the frame assembly 20, according to a preferred embodiment of the present invention; and, FIG. 6 shows a partial close-up view illustrating the handle 45 according to a preferred embodiment of the present invention.

Referring now to FIGS. 5a and 5b for a side and a rear perspective view illustrating the foldable motorized beach cart 10 comprising the axle mount 25, an aperture for the motor 30, an aperture for the rear axle 27, a piano hinge 24, a handle pivot 50, a motor 30, a gear box 31, a wheel 26, and a battery compartment 40 and charging port 28 is shown.

Figure 6:
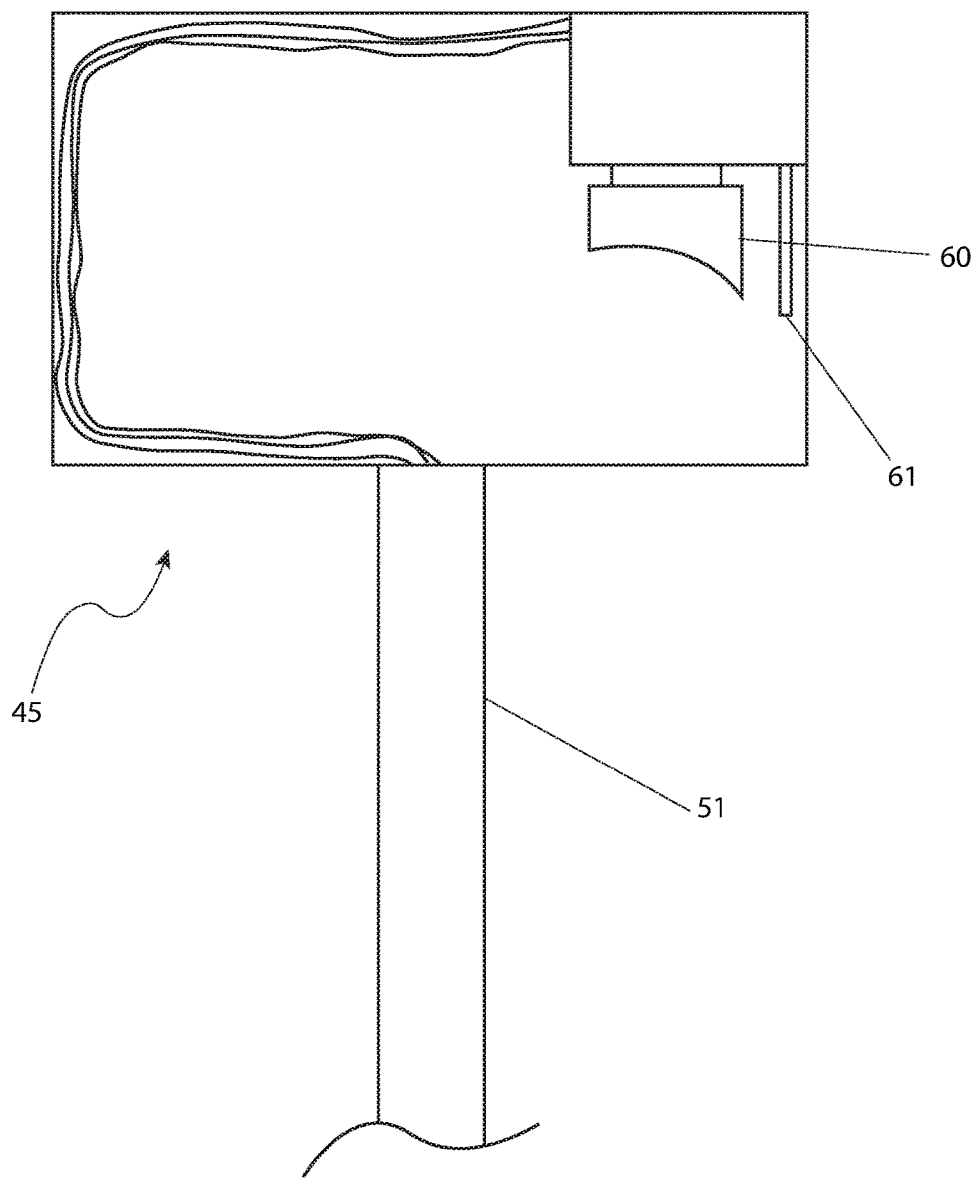

Referring finally to FIG. 6, a detailed illustration the first handle 45 comprising a variable speed toggle switch 60 and a forward and reverse directional switch 61 is disclosed. As shown, the approximate length of the handle 45 may comprise six inches (6 in.) and the approximate width of the handle may comprise three-and-a-half inches (3½ in.). The approximate length of the foldable motorized beach cart forty-three inches (43 in). The approximate width of the beach cart may be thirty inches (30 in.), and the approximate height of the beach cart may be fourteen inches (14 in.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A folding beach cart, comprising:
a hinge member;
a tubular front "U"-shaped frame member extending forward from said hinge member when configured in an operable plane;
a first tubular rear "U"-shaped frame member extending rearward from said hinge member when configured in said operable plane;
a second tubular rear "U"-shaped frame member extending rearward from said hinge member spaced apart from the first rear "U"-shaped frame member in said operable plane;
a rear plate attached underneath said first rear "U"-shaped frame member and said second rear "U"-shaped frame member
an axle mount attached to said rear plate;
a rear axle passing through said axle mount;
a front plate attached underneath said front "U"-shaped frame member;
a centrally located handle pivot attached to said front plate;
a handle assembly pivotally mounted to said handle pivot;
a front wheel attached to said handle assembly, said front wheel operatively supporting said front plate;
a rear wheel attached to said rear axle;
a power source operatively attached to the folding beach cart;
an electrical control mechanism electrically connected to said power source; and,
a drive train in electrical communication with said electrical control mechanism and in mechanical communication with said rear wheel, said the drive train for driving said rear wheel using electrical power supplied under the control of said electrical control mechanism;
wherein said hinge member can selectively pivot said front "U"-shaped frame member and said rear "U"-shaped frame member toward one another.

2. The cart of claim 1, wherein said handle assembly folds toward said front plate.

3. The cart of claim 1, wherein said drive train includes a gear box in rotational communication with said rear wheel and an electric motor in rotational communication with said gear box and in electrical communication with said electrical control mechanism.

4. The cart of claim 1, wherein said handle assembly includes a pivoting handle post and a handle secured to a top of said handle post.

5. The cart of claim 4, wherein said handle retains said electrical control mechanism.

6. The cart of claim 5, wherein said electrical control mechanism includes a throttle switch and a directional switch.

7. The cart of claim 6, wherein said throttle switch accelerates and decelerates a motor.

8. The cart of claim 6, wherein said directional switch controls a rotational direction of the rear wheel.

9. The cart of claim 6, wherein said throttle switch is in electrical communication with a motor using electrical wiring channeled through said handle post.

10. The cart of claim 1, wherein said power source is a rechargeable battery.

11. The cart of claim 10, further including a charge port in electrical communication with said rechargeable battery.

12. The cart of claim 11, further including a solar panel for supplying electrical power to said charge port.

13. The cart of claim 1, wherein said tubular front "U"-shaped frame member is longer than said tubular rear "U"-shaped frame member.

14. The cart of claim 1, wherein said tubular front "U"-shaped frame member is aluminum.

15. The cart of claim 1, wherein said tubular front "U"-shaped frame member is plastic.

16. The cart of claim 1, wherein said power source is mounted to said rear plate.

17. The cart of claim 1, wherein said rear plate comprised "L"-shaped angle iron.

18. The cart of claim 1, further including a second front wheel attached to said handle assembly, said second front wheel operatively supporting said front plate.

19. The cart of claim 18, further including a second rear wheel attached to said rear axle, wherein when said hinge member selectively pivots said front "U"-shaped frame member and said rear "U"-shaped frame member toward one another said front wheel and said second front wheel are disposed between said rear wheel and said second rear wheel.

\* \* \* \* \*